(No Model.)

P. GRABLER.
VALVE MECHANISM FOR FLUID PRESSURE BRAKES.

No. 501,615. Patented July 18, 1893.

Witnesses:
J. N. Cooke
Robt. W. Lotter

Inventors
Peter Grabler
By Kay & Totten
Attorneys

UNITED STATES PATENT OFFICE.

PETER GRABLER, OF PITTSBURG, ASSIGNOR OF ONE-HALF TO EDWARD F. WELSH, OF WILMERDING, PENNSYLVANIA.

VALVE MECHANISM FOR FLUID-PRESSURE BRAKES.

SPECIFICATION forming part of Letters Patent No. 501,615, dated July 18, 1893.

Application filed February 20, 1892. Serial No. 422,264. (No model.)

*To all whom it may concern:*

Be it known that I, PETER GRABLER, a resident of Pittsburg, in the county of Allegheny and State of Pennsylvania, have invented a new and useful Improvement in Valve Mechanism for Fluid-Pressure Brakes; and I do hereby declare the following to be a full, clear, and exact description thereof.

My invention relates to valve mechanism for fluid pressure brakes.

In the general construction of this class of brakes each car is provided with a main air pipe, an auxiliary reservoir, a brake cylinder, and a triple valve, with connections to the main air brake pipe, the auxiliary reservoir and the brake cylinder. The auxiliary reservoir on each car is supplied with air from the main reservoir located on the locomotive when the main air pipes of the several cars composing the train are connected to form a continuous conduit from the main reservoir to the several auxiliary reservoirs.

In applying the brakes under ordinary circumstances the triple valve operates to close communication between the main air pipe and the auxiliary reservoir and open communication between the auxiliary reservoir and the brake cylinder, and vice versa in releasing the brakes. While this function of the triple valve suffices for ordinary purposes where the train is composed of a few cars and where there is no particular necessity of very quick action, yet for occasions where a very quick action is necessary on trains composed of a large number of cars the simple communication formed by the triple valve between the auxiliary reservoir and the brake cylinder is inadequate. To provide for such occasions where a very quick action is required, different forms of valve mechanism have been employed whereby the triple valve is possessed of a new function, namely, that of effecting direct communication between the main air pipe and the brake cylinder.

It is to this function of the triple valve that my invention relates more especially, its object being to simplify the construction of such valve mechanism and increase its quickness of action.

To these ends my invention consists, generally stated, in the combination of a main air pipe, an auxiliary reservoir, a brake cylinder, a triple valve, and an auxiliary valve to be operated directly by the pressure of air from the auxiliary reservoir to open direct communication from the main air pipe to the brake cylinder.

Figure 1:
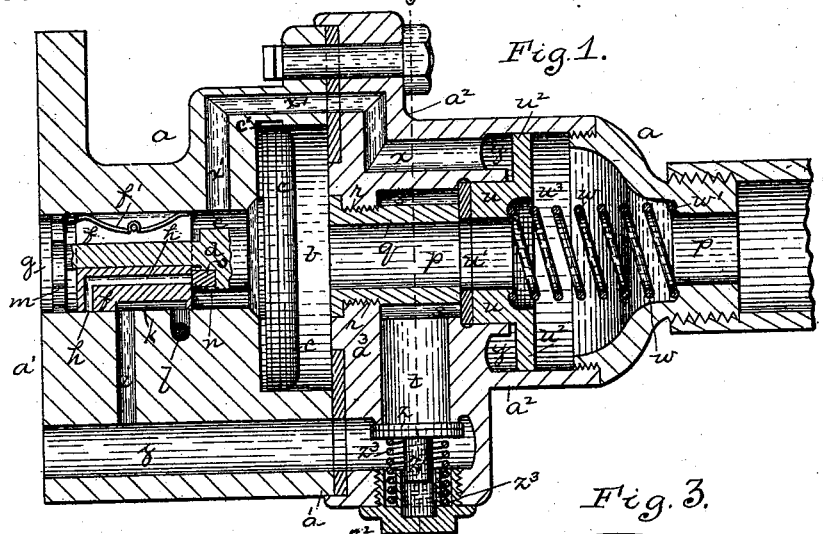
Figure 4:
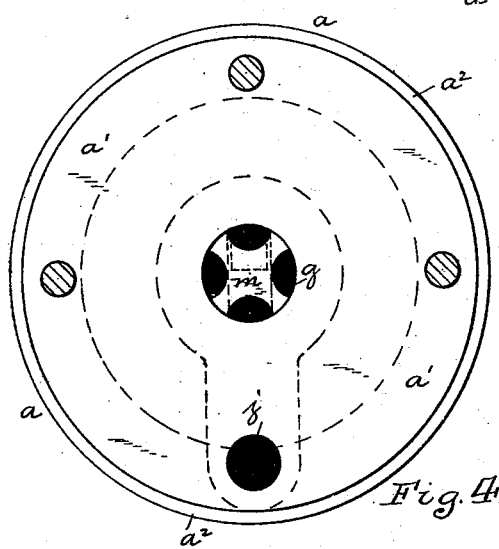
Figure 3:
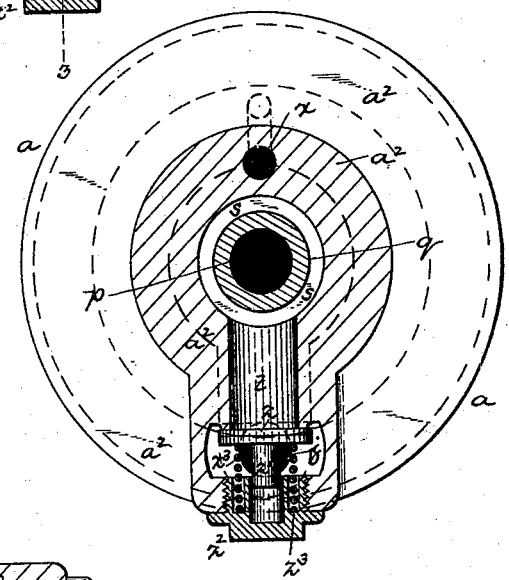
Figure 2:
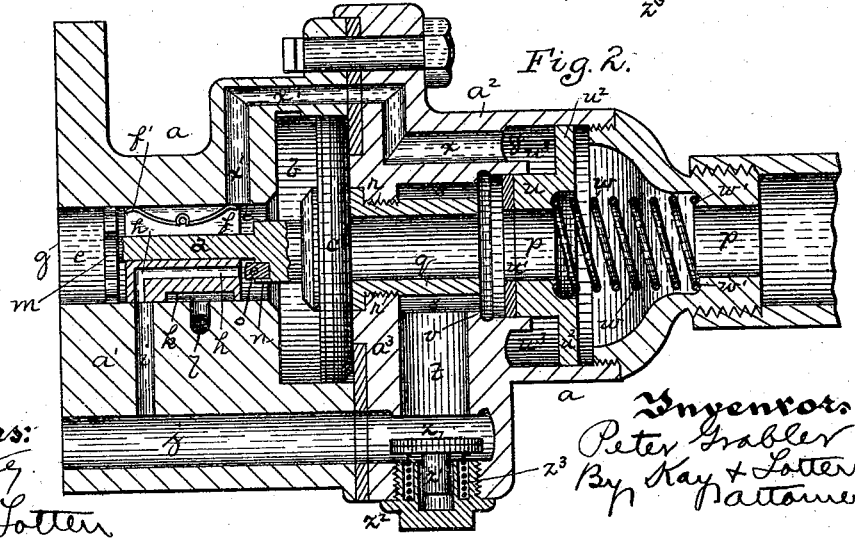

In the accompanying drawings Figure 1 is a vertical longitudinal section of a triple valve with my improved valve mechanism applied thereto. Fig. 2 is a like view showing the communication between the main air pipe and the brake cylinder open. Fig. 3 is a section on the line 3—3, Fig. 1. Fig. 4 is an end view.

Like letters indicate like parts in each.

The arrangement of the auxiliary reservoir, the brake cylinder and the system of levers, &c., by means of which the brakes are applied or released has not been illustrated, as they form no part of my invention, and they may be arranged in any convenient manner.

The casing $a$ in which the triple valve and improved valve mechanism are located is arranged under the car in a convenient position relative to the auxiliary reservoir and brake cylinder. This casing $a$ is composed of the two sections $a'$ $a^2$ secured together in any suitable manner to form a practically air-tight connection.

Within the section $a'$ of the casing $a$ is formed the piston chamber $b$ adapted to receive the piston $c$ which is arranged to reciprocate therein. Secured to the piston $c$ is the rod or stem $d$ which extends back into the valve chamber $e$. The piston chamber $b$, communicates with the valve chamber $e$ by means of the small feeding groove $c'$. Fitting loosely around said rod or stem $d$ is the slide valve $f$ which controls communication between the auxiliary reservoir and the brake cylinder. The spring $f'$ acts to retain said slide valve $f$ properly in its seat. The valve chamber $e$ communicates directly with the auxiliary reservoir by the port $g$.

To form communication between the valve chamber $e$ and the passage $j$ leading to the brake cylinder, a passage $h$ is formed in the slide valve $f$, said passage $h$ being adapted to coincide with the passage $i$ leading to the passage $j$. The said passage $i$ is further adapted to form communication with the passage $k$ formed in the slide valve $f$, said passage $k$ in turn communicating with the passage $l$ leading to the open air. The slide valve $f$ is operated by a shoulder $m$ and a collar $n$ formed on the stem $d$, said shoulder $m$ and collar $n$ being separated by a distance greater than the length of the slide valve $f$, so that the stem $d$ has a certain amount of movement independent of any movement on the part of said slide valve.

To open and close communication between the valve chamber $e$ and the passage $h$ in the slide valve $f$, the shoulder $m$ of the stem $d$ is formed with a slight projection or stud $o$ adapted to cover the port of said passage $h$. This stud $o$ is preferably formed of rubber properly hardened, and is adapted to press tightly against the port of the passage $h$ to form a practically air-tight connection, as shown in Fig. 1. The stud $o$ may be dispensed with and the face of the shoulder itself be made to close said port. By this construction it is apparent that upon the initial movement of the stem $d$ independent of any movement on the part of the slide valve $f$, the stud $o$ on the shoulder $m$ will be unseated from the port of the passage $h$, and communication will be formed between the said passage $h$ and the valve chamber $e$. This is a simple device and dispenses with the use of a slide valve within the passage $h$ such as is employed in certain forms of valve apparatus for this class of brakes, and thus decreases the amount of friction created in opening communication between the valve chamber $e$ and the passage $h$.

As hereinbefore stated the casing $a$ is composed of two sections $a'$ $a^2$. The section $a^2$ contains the main passage $p$ which is connected up to the main air pipe communicating with the main air reservoir on the locomotive. A thimble $q$ is adapted to engage with a threaded opening $r$ in the partition $a^3$ which separates the two sections $a'$ $a^2$. The interior passage of the thimble $q$ in conjunction with the main passage $p$ forms one continuous passage leading from the main air pipe to the piston chamber $b$. Around the thimble $q$ is formed the annular chamber $s$ which communicates with the passage $t$.

In order to control the admission of air from the main passage $p$ to the annular chamber $s$, a valve $u$ is provided. This valve $u$ is formed with the central opening $u'$ to provide for the continuous passage of air from the main air pipe directly to the piston chamber $b$ without interruption. The valve $u$ is adapted to abut against the end of the annular shoulder $v$ formed in the interior of the casing, and said valve is held normally in position to close the annular chamber $s$ by means of the spring $w$, said spring fitting at one end against the annular shoulder $w'$ and at the opposite end against the valve $u$ itself. This spring $w$ has a power of resistance relative to the pressure it may be called upon to resist, all of which will be more fully represented and explained in the detail description of the operation of my invention.

The valve $u$ is provided with the flange $u^2$ which fits neatly within the valve chamber $u^3$ of the section $a^2$ and is adapted to move freely back and forth therein. A passage $x$ in the walls of the section $a^2$ communicates with a passage $x'$ in the walls of the section $a'$ of the casing $a$. This passage $x'$ leads from the valve chamber $e$, and as the said valve chamber $e$ is always in communication with the auxiliary reservoir, and the port leading to the passage $x'$ is always open, air from the auxiliary reservoir is always free to pass from the passage $x'$ to the passage $x$. The said passage $x$ in turn communicates with the annular passage $y$ inclosed by the flange $u^2$ of the valve $u$. The passage $t$ is provided with the valve $z$ adapted to control communication between said passage $t$ and the passage $j$ leading to the brake cylinder. The valve $z$ is secured to a stem $z'$, said stem fitting in a guide in the screw cap $z^2$. A spring $z^3$ encircles the stem $z'$ and is interposed between said valve and a seat formed for said spring in the screw cap $z^2$, whereby said valve is normally held in its seat to close the passage $t$.

The operation of my improved valve mechanism is as follows:—To supply the auxiliary reservoir the air is conveyed from the main reservoir on the locomotive through the several train pipes to the main passage $p$ of the triple valve, whence it passes directly through the continuous passage $p$ to the piston chamber $b$. The piston $c$ is thus brought to the position shown in Fig. 1 when the groove $c'$ allows the air to escape to the valve chamber $e$, whence it passes directly to the auxiliary reservoir. In this manner the pressure in the auxiliary reservoir is increased until it is equal to the pressure in the main air pipe. The air in the main reservoir and main air pipes generally has a pressure of from sixty-five to seventy-five pounds to the square inch, so that when the air is admitted, as above described, to the auxiliary reservoir, the same pressure is exerted within the auxiliary reservoir and the several passages and chambers within the casing of the triple valve and in communication with said auxiliary reservoir, particular mention being made of the passages $x$ $x'$ and the annular passage $y$. With the piston $c$ in the position shown in Fig. 1, the brake cylinder will be in communication with the open air through the passages $j$, $i$, $k$, and lastly the passage $l$ leading directly to the open air.

According to the well known principle involved in the operation of this class of brakes, to apply the brakes it is necessary to reduce the pressure in the main air pipe. Ordinarily where it is desired to apply the brakes without resorting to the quick acting device, the pressure in the main air pipe is reduced by means of the engineer's valve. This reduction of pressure in the main air pipe permits the higher pressure of air in the auxiliary reservoir to advance the piston $c$ to the right, thereby closing the groove $c'$ and cutting off the supply of air from the main air pipe to said auxiliary reservoir. The initial movement of the piston $c$ will act to withdraw the stud $o$ from the port of the passage $h$, and so form communication between the valve chamber $e$ and passage $h$. Upon the advance of the piston $c$ to the extreme right of the piston chamber $b$, the slide valve $e$ is also advanced by means of the collar $n$. The advance of the slide valve $e$ closes the communication of the passage $i$ with the passages $k$ and $l$, thus cutting off the communication of the brake-cylinder with the open air. The passage $h$ is brought into communication with the passage $i$, whence the air can pass directly to the passage $j$ and thence to the brake-cylinder where it operates the piston contained therein and through it the levers and other connections for applying the brake shoes to the wheels of the car. When the pressure in the auxiliary reservoir has been reduced by the escape of air to the brake-cylinder until it is slightly less than the pressure in the main air pipe, the air coming from said main pipe through the main passage $p$ will force back the piston $c$ until the stud $o$ closes the port leading to the passage $h$. This cuts off the supply of air from the auxiliary reservoir to the brake-cylinder and the brakes are held by the air already admitted to the brake cylinder. In order to release the brakes, the pressure in the main air pipe is increased by the admission of air from the main reservoir. This increase of pressure in the main air pipe will force the piston $c$ back to its normal position and open communication again of the brake cylinder with the open air through the passages $j$, $i$, $k$ and $l$. The groove $c'$ is at the same time uncovered when the pressure in the auxiliary reservoir is restored to its original strength. In case, however, a very quick action is desired, the direct communication between the main air pipe and the brake cylinder is opened. To accomplish this result, the engineer, by means of a suitable valve at his command, discharges a greater portion of air than that discharged in ordinary braking as above described. As a result, the pressure in the main air pipe is correspondingly reduced to a lower degree than the reduction required for ordinary purposes. This reduction of pressure in the main air pipe will not only cause the piston $c$ to advance to the extreme right of the piston chamber $b$, as before, to open communication between the auxiliary reservoir and the brake cylinder, but furthermore the increased reduction of pressure in the main air pipe must be sufficient to cause the pressure of the auxiliary reservoir working in the passages $x$, $x'$ and $y$, to overcome the resistance of the spring $w$. This pressure of air from the auxiliary reservoir acting on the flange $u^2$ of the valve $u$ will overcome the resistance offered by the spring $w$ when the valve $u$ will be unseated to permit the air coming from the main air pipe to pass directly from the passage $p$ into the annular chamber $s$. The spring $w$ must be possessed of sufficient power of resistance that when the pressure is reduced in the main air pipe to open communication simply between the auxiliary reservoir and the brake cylinder, said spring will exert enough resistance to prevent the pressure of air from opening the valve $u$, but upon a further reduction of the pressure in the main air pipe the resistance offered by said spring will be overcome and the valve $u$ unseated to open communication between the main air pipe and the brake cylinder. From the chamber $s$ it passes into the passage $t$ where it overcomes the resistance of the spring $z^3$, unseats the valve $z$, and passes to the passage $j$ and thence to the brake cylinder to apply the brakes. At the same time the passage $h$ is in communication with the passage $i$ leading to the passage $j$ in direct communication with the brake cylinder, so that the pressure already obtained in the brake cylinder is reinforced by the pressure of air admitted from the auxiliary reservoir itself. The valve $z$ prevents the return of air from the brake cylinder to the main air pipe upon the reduction of the pressure in said main air pipe below the pressure in the brake cylinder, as on such occasion the spring $z^2$ will force the valve $z$ back to its seat.

By the above construction I am enabled to dispense with any extra movement of the piston to accomplish the admission of air directly from the main air pipe to the brake cylinder, as in most of the valve mechanism employed for this purpose. At the same time, by the use of the passages $x$, $x'$ and $y$ which are always in communication with the auxiliary reservoir and contain an equal pressure of air, there is a constant pressure exerted against the flange $u^2$ which acts, on the instant the pressure in the main air pipe is sufficiently reduced, to unseat the valve $u$. This enables me to accomplish the communication between the main air pipe and the brake cylinder with less reduction of the pressure of air in the main air pipe, whereby a correspondingly greater pressure is exerted upon the piston of the brake cylinder which affords quicker and more efficient action of the brakes.

The valve $u$ is retained in its seat by the pressure of the spring $w$ combined with the pressure of air from the main air pipe as long as the pressure within the auxiliary valve and the main air pipe remains the same. This combined pressure presses the valve $u$ very closely in its seat and prevents the escape of any air to the chamber $s$, while at the same time the valve $u$ can be fitted comparatively loosely within the casing so that it may be unseated the more readily and with less friction when the pressure in the main air pipe is reduced sufficiently.

What I claim as my invention, and desire to secure by Letters Patent, is—

1. A valve mechanism for fluid pressure brakes, having a main air pipe, an auxiliary reservoir, a brake cylinder, a triple valve, an annular valve fitting within a valve chamber and having a central passage leading to said triple valve, a direct passage from the main air pipe to the brake cylinder controlled by said valve, one side of said annular valve being exposed to the pressure of the main air pipe, and a direct passage from the auxiliary reservoir to the opposite side of said valve, substantially as and for the purposes set forth.

2. A valve mechanism for fluid pressure brakes, having a main air pipe, an auxiliary reservoir, a brake cylinder, and a triple valve, an annular valve with a flange formed thereon fitting within a valve chamber, said annular valve having a central passage leading to the triple valve, a direct passage from the main air pipe to the brake cylinder controlled by said annular valve, the flange of said annular valve being on one side exposed to the pressure of the main air pipe, said valve chamber having an annular space formed therein on the other side of said annular valve, and a passage communicating with said annular space and the auxiliary reservoir, substantially as and for the purposes set forth.

3. A valve mechanism for fluid pressure brakes, having a main air pipe, an auxiliary reservoir, a brake cylinder and a triple valve, and having the auxiliary valve chamber $u^3$ in the main air pipe, the annular spring operated valve $u$ fitting therein, a direct passage from the auxiliary reservoir to said annular valve, and a passage leading from said valve $u$ to the brake cylinder, said passage having the check valve $z$ therein, substantially as and for the purposes set forth.

In testimony whereof I, the said PETER GRABLER, have hereunto set my hand.

PETER GRABLER.

Witnesses:
ROBT. D. TOTTEN,
J. N. COOKE.